(12) United States Patent
Herget et al.

(10) Patent No.: US 8,351,152 B2
(45) Date of Patent: Jan. 8, 2013

(54) MAGNETIC WRITER STRUCTURES FORMED USING POST-DEPOSITION TILTING

(75) Inventors: Philipp Herget, San Jose, CA (US); Pierre-Oliver Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 12/547,246

(22) Filed: Aug. 25, 2009

(65) Prior Publication Data

US 2011/0051284 A1    Mar. 3, 2011

(51) Int. Cl.
*G11B 5/127* (2006.01)

(52) U.S. Cl. ............... 360/125.01; 360/121; 360/241

(58) Field of Classification Search .......... 360/121, 360/119.11, 123.01–125.75, 241; 29/603.07–603.27
See application file for complete search history.

(56) References Cited

U.S. PATENT DOCUMENTS

| | | | | |
|---|---|---|---|---|
| 3,846,841 A | | 11/1974 | Lazzari et al. | 360/121 |
| 4,176,384 A | * | 11/1979 | Yang | 360/121 |
| 4,233,637 A | | 11/1980 | Kubota | 360/10 |
| 4,451,862 A | | 5/1984 | Rijckaert et al. | 360/109 |
| 4,855,854 A | | 8/1989 | Wada et al. | 360/126 |
| 4,949,207 A | | 8/1990 | Lazzari | 360/119 |
| 5,067,230 A | | 11/1991 | Meunier et al. | 29/603 |
| 5,283,942 A | | 2/1994 | Chen et al. | 29/603 |
| 5,655,286 A | * | 8/1997 | Jones, Jr. | 29/603.13 |
| 5,757,589 A | | 5/1998 | Kang | 360/109 |
| 5,910,869 A | | 6/1999 | Fedeli | 360/113 |
| 5,926,348 A | | 7/1999 | Shouji et al. | 360/113 |
| 6,122,445 A | | 9/2000 | Yamada | |
| 6,198,607 B1 | | 3/2001 | Cain et al. | 360/318.1 |
| 6,289,564 B1 | | 9/2001 | Novotny | 29/25.35 |
| 6,381,104 B1 | | 4/2002 | Soeno et al. | 360/294.4 |
| 6,473,273 B1 | | 10/2002 | Kikuiri | 360/271.5 |
| 6,477,018 B1 | | 11/2002 | Terunuma | 360/317 |
| 6,493,191 B1 | | 12/2002 | Cain et al. | 360/246.2 |
| 6,501,619 B1 | * | 12/2002 | Sherrer et al. | 360/125.03 |
| 6,650,496 B2 | | 11/2003 | Nozieres et al. | 360/63 |
| 6,687,977 B2 | | 2/2004 | Knapp et al. | 29/603.15 |
| 6,785,096 B2 | | 8/2004 | Kuwajima et al. | 360/294.4 |
| 6,842,313 B1 | | 1/2005 | Mallary | 360/319 |
| 6,895,657 B2 | | 5/2005 | Mishima et al. | 29/603.07 |

(Continued)

FOREIGN PATENT DOCUMENTS

EP  1 748 283  7/2006

(Continued)

OTHER PUBLICATIONS

Church, MA, and Decker, SK, "Integrated Magnetoresistive Read Inductive Write Film Head Assembly" IBM TDB 12-83 p. 3366-3367.

(Continued)

*Primary Examiner* — Allen Heinz
(74) *Attorney, Agent, or Firm* — Zilka-Kotab, PC

(57) ABSTRACT

A system according to one embodiment includes a first portion comprising at least a portion of a coil structure and at least a portion of a magnetic yoke, the first portion being oriented at an angle of greater than 0° and less than 90° relative to a substantially planar portion of an underlying substrate; a first pole; a second pole; and a write gap, a portion of the write gap having a plane of deposition oriented about perpendicular to a final media-facing surface of the write gap.

18 Claims, 12 Drawing Sheets

U.S. PATENT DOCUMENTS

| | | | |
|---|---|---|---|
| 6,943,990 B1 | 9/2005 | Yokoyama et al. | 360/294.4 |
| 7,064,933 B2 | 6/2006 | Macken et al. | 360/294.7 |
| 7,100,266 B2 | 9/2006 | Plumer et al. | 29/603.14 |
| 7,126,330 B2 | 10/2006 | Peczalski et al. | 324/247 |
| 7,130,159 B2 | 10/2006 | Shimizu et al. | 360/294.4 |
| 7,151,650 B2 | 12/2006 | Lee | 360/294.7 |
| 7,170,718 B2 | 1/2007 | Sakamoto et al. | 360/264.2 |
| 7,779,535 B2 | 8/2010 | Kanaya et al. | |
| 8,240,024 B2 | 8/2012 | Biskeborn et al. | |
| 2003/0208901 A1 | 11/2003 | Lim et al. | 29/603.12 |
| 2005/0235483 A1 | 10/2005 | Biskeborn et al. | 29/603.01 |
| 2005/0264944 A1 | 12/2005 | Fontana, Jr. et al. | 360/313 |
| 2006/0171081 A1 | 8/2006 | Brcuer et al. | 360/313 |
| 2006/0176142 A1 | 8/2006 | Naito et al. | 338/32 |
| 2006/0256471 A1 | 11/2006 | Plumer et al. | 360/122 |
| 2007/0047143 A1 | 3/2007 | Matsumoto | |
| 2012/0260496 A1 | 10/2012 | Biskeborn et al. | |

FOREIGN PATENT DOCUMENTS

| | | |
|---|---|---|
| JP | 57208621 | 12/1985 |

OTHER PUBLICATIONS

U.S. Appl. No. 12/547,224, filed Aug. 25, 2009.

U.S. Appl. No. 12/614,275, filed Nov. 6, 2009.

Chapman, et al., "A New Horizontal MR Head Structure", IEEE Transactions on Magnetics, vol. 25, No. 5, Sep. 1989, pp. 3689-3691.

Ho, et al., "Study of Longitudinal Stabilization Using In-Stack Biasing", IEEE Transactions on Magnetics, vol. 40, No. 1, Jan. 2004, pp. 189-194.

Lamberton, et al., "Current-in-Plane GMR Trilayer Head Design for Hard-Disk Drives: Characterization and Extendibility", IEEE Transactions on Magnetics, vol. 43, No. 2, Feb. 2007, pp. 645-650.

Lazzari, "Planar Silicon Heads/Conventional Thin Film Heads Recording Behavior Comparisons" IEEE Transactions on Magnetics, vol. 32, No. 1, Jan. 1996, pp. 80-83.

Nozieres, et al., "Planar GMR Head Design for 50+ Gbit/in2 Recording", Journal of Magnetism and Magnetic Materials, 242-245(2002)341-344.

Tamakawa, et al., "Multichannel Write and GMR Heads for Over 1 TB Tape System", IEEE Transactions on Magnetics, vol. 42, No. 10, Oct. 2006, pp. 2324-2326.

Non-Final Office Action Summary from U.S. Appl. No. 12/547,224 dated Oct. 31, 2011.

Final Office Action Summary from U.S. Appl. No. 12/547,224 dated Jan. 30, 2012.

Notice of Allowance and Fee(s) Due from U.S. Appl. No. 12/614,275 dated May 17, 2012.

Notice of Allowance and Fee(s) Due from U.S. Appl. No. 12/547,224 dated Apr. 2, 2012.

Supplemental Notice of Allowability from U.S. Appl. No. 12/547,224 dated May 14, 2012.

U.S. Appl. No. 13/662,300 filed Oct. 26, 2012.

* cited by examiner

MAGNETIC WRITER STRUCTURES FORMED USING POST-DEPOSITION TILTING

BACKGROUND

The present invention relates to thin film processing, and more particularly, this invention relates to methods for fabricating magnetic writer structures using post-deposition tilting.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For magnetic storage systems, that goal has lead to increasing the linear density and track density on recording tape or hard disk, and in some cases decreasing the thickness of the magnetic medium. However, the development of small footprint, higher performance magnetic storage systems has created various problems in the design of a head assemblies for use in such systems.

SUMMARY

A method according to one embodiment includes forming a first portion of a thin film writer structure on a substantially planar portion of a substrate such that planes of deposition of the first portion of the writer structure are substantially parallel to a plane of the substrate; forming a portion of a write gap of the writer structure at an angle of greater than 0° relative to the substantially planar portion of the substrate; and causing the writer structure to tilt at an angle relative to the plane of the substrate such that a plane of deposition of the write gap is oriented about perpendicular to a final media-facing surface of the writer structure.

A method according to another embodiment includes forming a first portion of a thin film writer structure on a substantially planar portion of a substrate such that planes of deposition of the first portion of the writer structure is substantially parallel to a plane of the substrate; forming a sloped portion towards one side of the first portion of the writer structure, an upper surface of the sloped portion having an angle of greater than 0° relative to the substantially planar portion of the substrate; forming a portion of a first pole of the writer structure on the sloped portion; forming a write gap on the portion of the first pole; forming a portion of a second pole of the writer structure on the write gap; causing the writer structure to tilt at an angle relative to the plane of the substrate such that a plane of deposition of the write gap is about perpendicular to a final media-facing surface of the writer structure; and after causing the writer structure to tilt, fixing the writer structure in place on the substrate at the angle.

A system according to one embodiment includes a first portion comprising at least a portion of a coil structure and at least a portion of a magnetic yoke, the first portion being oriented at an angle of greater than 0° and less than 90° relative to a substantially planar portion of an underlying substrate; a first pole; a second pole; and a write gap, a portion of the write gap having a plane of deposition oriented about perpendicular to a final media-facing surface of the write gap.

A system according to another embodiment includes a first portion comprising at least a portion of a coil structure, at least a portion of a magnetic yoke, a first pole, and a write gap, a portion of the write gap nearest a media-facing surface of the first portion being oriented at an angle of greater than 0° and less than 90° relative to a substantially planar portion of an underlying substrate, wherein the first pole has an upper surface oriented about perpendicular to a media-facing surface of the first pole; and a second pole formed above the first pole.

Any of these embodiments may be implemented in a magnetic data storage system such as a tape drive system, which may include a magnetic head as recited above, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
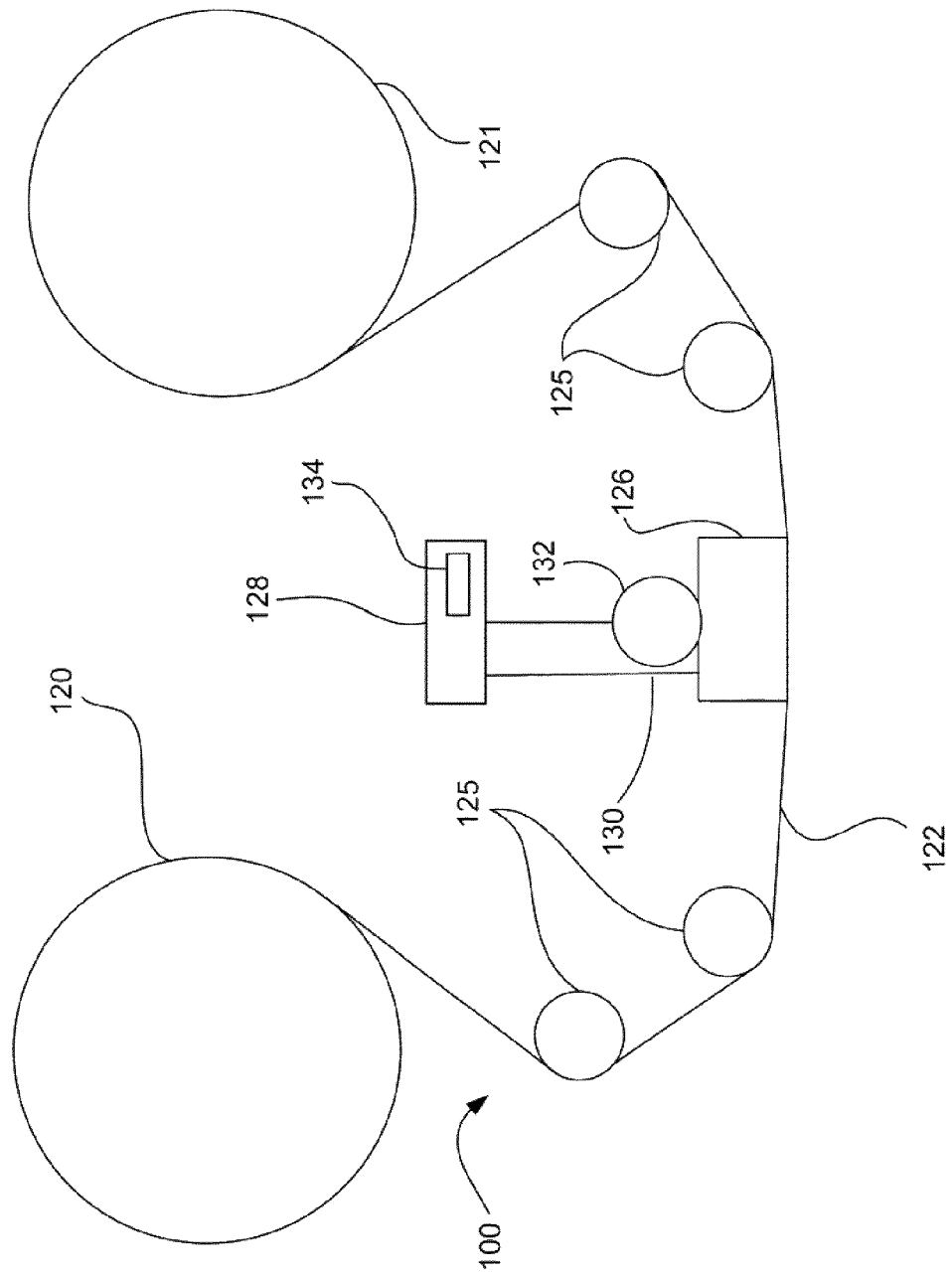
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic writers, as well as operation and/or methods of manufacture thereof.

In one general embodiment, a method comprises forming a first portion of a thin film writer structure on a substantially planar portion of a substrate such that planes of deposition of the first portion of the writer structure are substantially parallel to a plane of the substrate; forming a portion of a write gap of the writer structure at an angle of greater than 0° relative to the substantially planar portion of the substrate; and causing the writer structure to tilt at an angle relative to the plane of the substrate such that a plane of deposition of the write gap is oriented about perpendicular to a final media-facing surface of the writer structure.

In another general embodiment, a method comprises forming a first portion of a thin film writer structure on a substantially planar portion of a substrate such that planes of deposition of the first portion of the writer structure is substantially parallel to a plane of the substrate; forming a sloped portion towards one side of the first portion of the writer structure, an upper surface of the sloped portion having an angle of greater than 0° relative to the substantially planar portion of the substrate; forming a portion of a first pole of the writer structure on the sloped portion; forming a write gap on the portion of the first pole; forming a portion of a second pole of the writer structure on the write gap; causing the writer structure to tilt at an angle relative to the plane of the substrate such that a plane of deposition of the write gap is about perpendicular to a final media-facing surface of the writer structure; and after causing the writer structure to tilt, fixing the writer structure in place on the substrate at the angle.

In another general embodiment, a system comprises a first portion comprising at least a portion of a coil structure and at least a portion of a magnetic yoke, the first portion being oriented at an angle of greater than 0° and less than 90° relative to a substantially planar portion of an underlying substrate; a first pole; a second pole; and a write gap, a portion of the write gap having a plane of deposition oriented about perpendicular to a final media-facing surface of the write gap.

In another general embodiment, a system comprises a first portion comprising at least a portion of a coil structure, at least a portion of a magnetic yoke, a first pole, and a write gap, the write gap being oriented at an angle of greater than 0° and less than 90° relative to a substantially planar portion of an underlying substrate, wherein the first pole has an upper surface oriented about perpendicular to a media-facing surface of the first pole; and a second pole formed above the first pole.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of magnetic recording system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
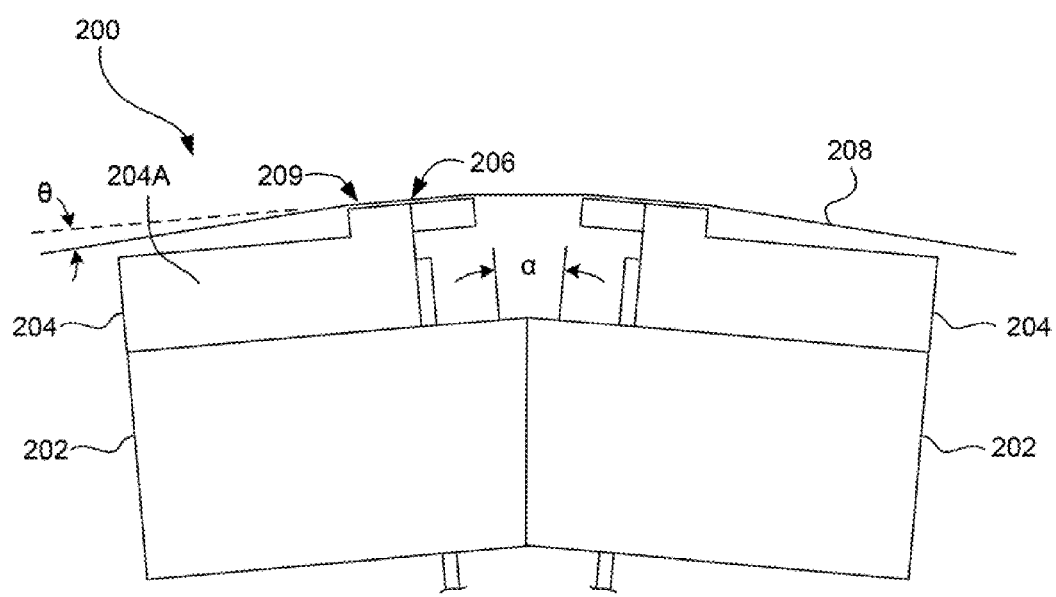
FIG. 2 illustrates a side view of a bidirectional, two-module magnetic tape head according to one embodiment.

By way of example, FIG. 2 illustrates a side view of a bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with readers and/or writers formed thereon. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees. The substrates 204A are typically constructed of a wear resistant material, such as AlTiC, a ceramic, etc.

The readers and writers may be arranged in a piggyback configuration. The readers and writers may also be arranged in an interleaved configuration. Alternatively, each array of channels may be readers or writers only. Any of these arrays may contain one or more servo readers.

Figure 3:
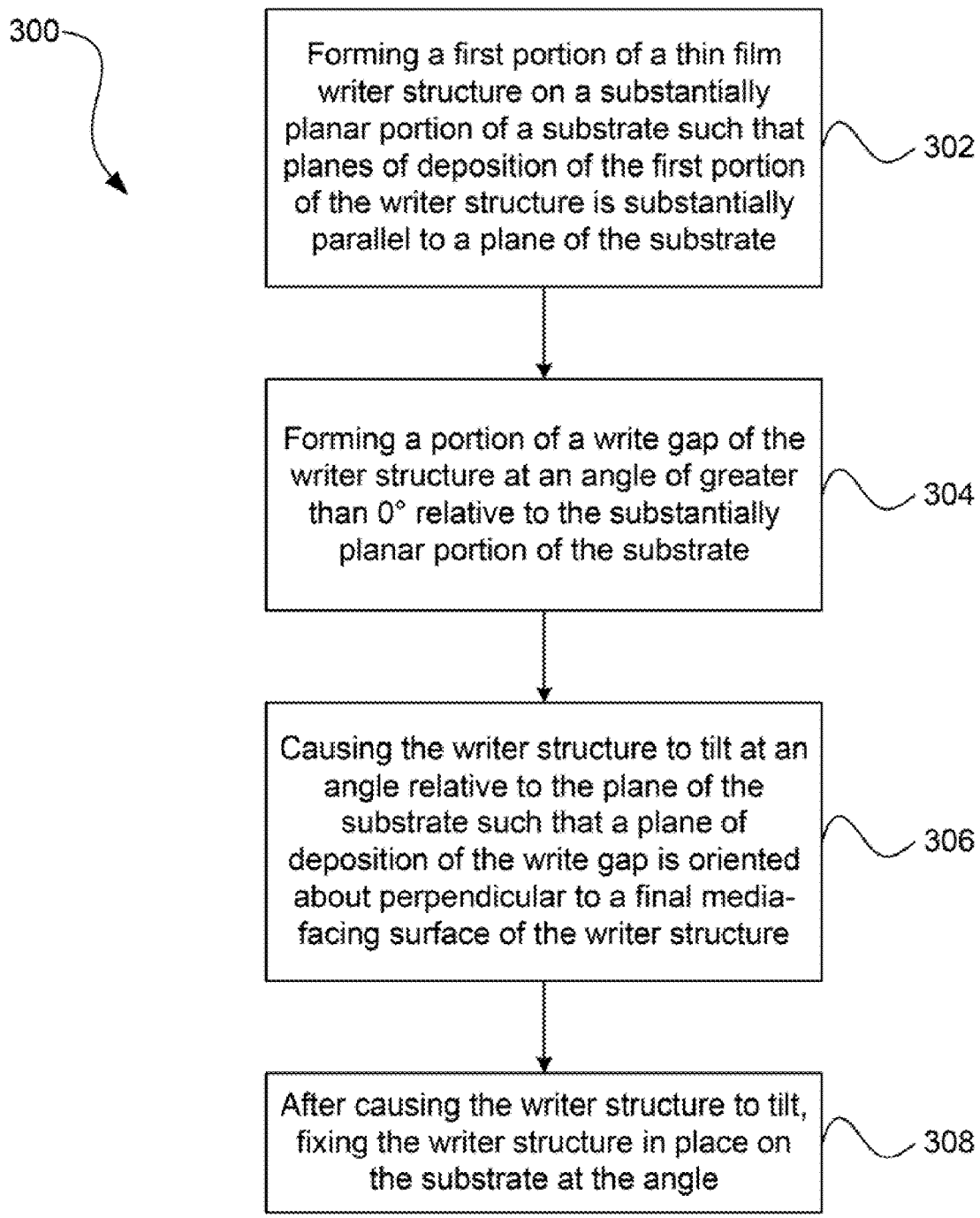
FIG. 3 is a flowchart of a method according to one embodiment.

FIG. 3 illustrates a method according to one embodiment. As an option, the present method 300 may be implemented in the context of the functionality and architecture of FIGS. 1-2 and 5-8. Of course, the method 300 may be carried out in any desired environment. It should be noted that the aforementioned definitions may apply during the present description.

Figure 5A:
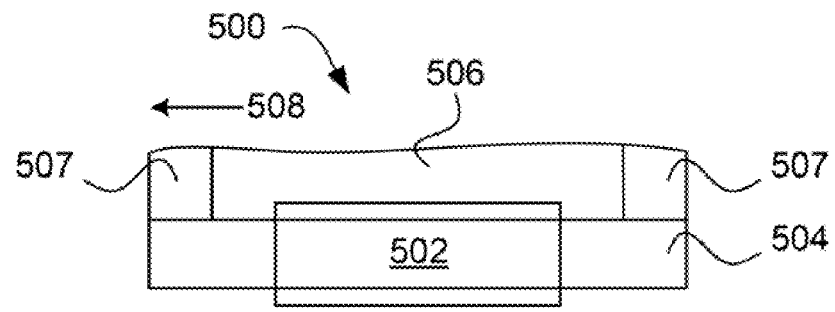
FIGS. 5A-5J are schematic diagrams illustrating steps in the production of a tilted writer stricture according to one embodiment.

With continued reference to FIG. 3, in operation 302, a first portion of a thin film writer structure is formed on a substantially planar portion of a substrate such that planes of deposition of the first portion of the writer structure is substantially parallel to a plane of the substrate. In FIG. 5A, for example, the first portion that is formed on a substrate is the coil 502 and lower yoke 504, along with an insulator 506. However, this example does not in any way limit what may be the first portion of the writer structure 500 that is formed.

With continued reference to FIG. 3, in operation 304, a portion of a write gap of the writer structure is formed at an angle of greater than 0° relative to the substantially planar portion of the substrate. In FIG. 5C, for example, this portion of at least one pole of the writer structure is shown as a ramp 510 formed toward the write side 508 of the writer structure 500. This example in no way limits the design and appearance of this ramp.

In operation 306, the writer structure is caused to tilt at an angle relative to the plane of the substrate such that a plane of deposition of the write gap is oriented about perpendicular to a final media-facing surface of the writer structure. Note that the "final media-facing surface" is meant to mean the surface that faces the media in the final product as sold. For example, the final media-facing surface may be an air bearing surface (ABS), tape bearing surface (TBS), etc. in a magnetic storage device. In many embodiments, the media-facing surface will be about parallel to the plane of the substrate. In FIG. 5H, for example, the writer structure 500 is tilted at an angle θ relative to the planar surface 523 of the substrate 520. This example is not limiting as to the angle and direction in which the writer structure 500 may be tilted.

In optional operation 308, after causing the writer structure to tilt, the writer structure may be fixed in place on the substrate at the angle. In FIG. 5I, for example, the writer structure 500 may be fixed in place with a material 522, which is then planarized as shown in FIG. 5J. This example is not limiting as to the type of material that is used to fix the writer structure 500 in place. In some approaches, operation 308 may be omitted.

In further approaches, the writer structure may be self-fixing, e.g., by a pre-applied adhesion layer, by naturally-occurring attractive forces with an underlying layer, etc.

In yet other approaches, a protective layer may be added to the writer structure, which may have the effect of fixing the writer structure in place.

In one embodiment, the substrate comprises silicon.

In another embodiment, the writer structure may be planarized along a plane substantially parallel to the plane of the substrate.

In yet another embodiment, the writer structure may be formed on a rigid platform that tilts with the writer structure.

In a further embodiment, an axis of the tilting is about parallel to the plane of the substrate.

Yet another approach includes portions of two poles that may be formed at an angle of greater than 0° relative to the substantially planar portion of the substrate.

Figure 8A:
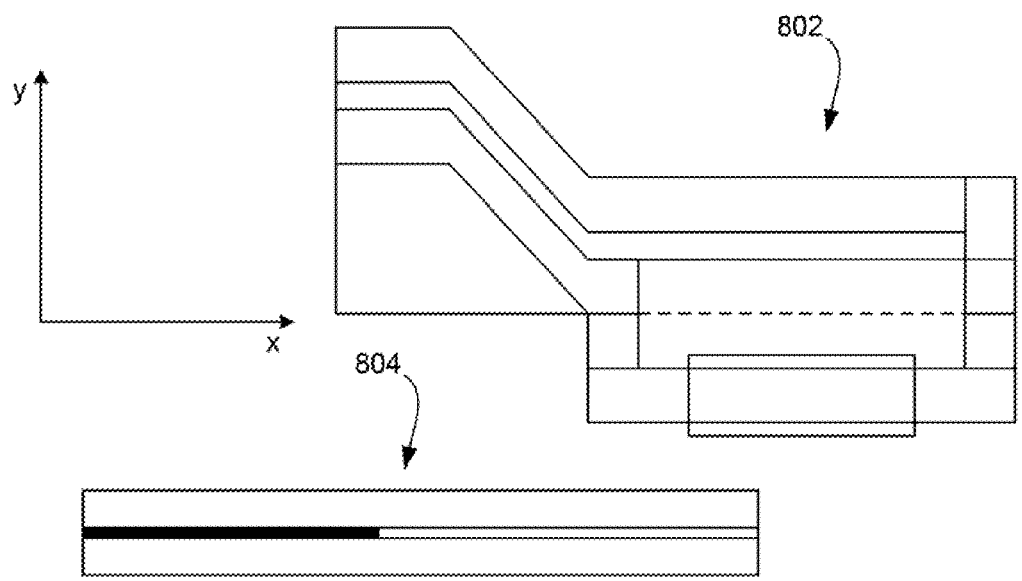
FIGS. 8A and 8B are schematic diagrams of a tilted writer structure and reader structure according to one embodiment.
Figure 8B:
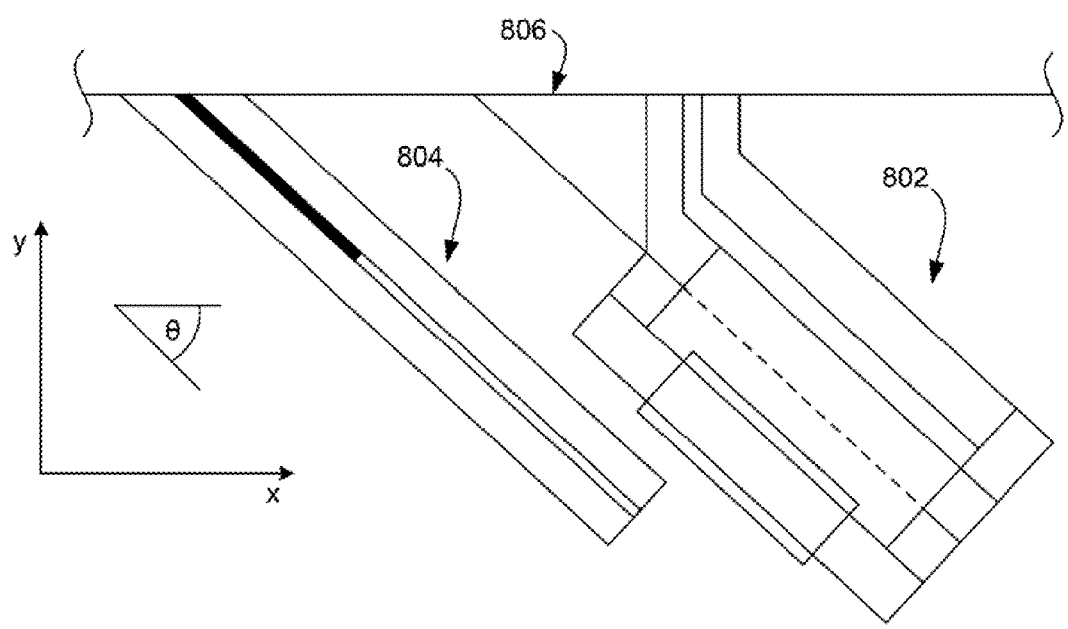

Another embodiment further comprises forming a magnetic sensor, wherein the sensor and the writer structure tilt together, as shown in FIGS. 8A and 8B.

Yet another embodiment further comprises removing a sacrificial portion of the substrate for creating a pivot point about which the writer structure may pivot, allowing the writer structure to be tilted relative to the plane of the substrate. Another embodiment which uses a pivot point may include the pivot point under and off-center from the writer structure.

A further embodiment which includes a pivot point wherein removing a portion of the substrate allows built-in stresses to cause the writer structure to tilt at the desired angle.

Yet another approach which includes a pivot point may have the pivot point spaced apart from the writer structure such that the writer structure pivots along an arc. Also, another approach may use capillary action operatively to cause the writer structure to tilt at the desired angle. Another embodiment may include removing a sacrificial portion of the substrate to cause another portion of the substrate to form a cantilever supporting the writer structure, wherein a local stress operatively causes the cantilever to bend, thereby causing the writer structure to tilt at the desired angle.

Figure 4:
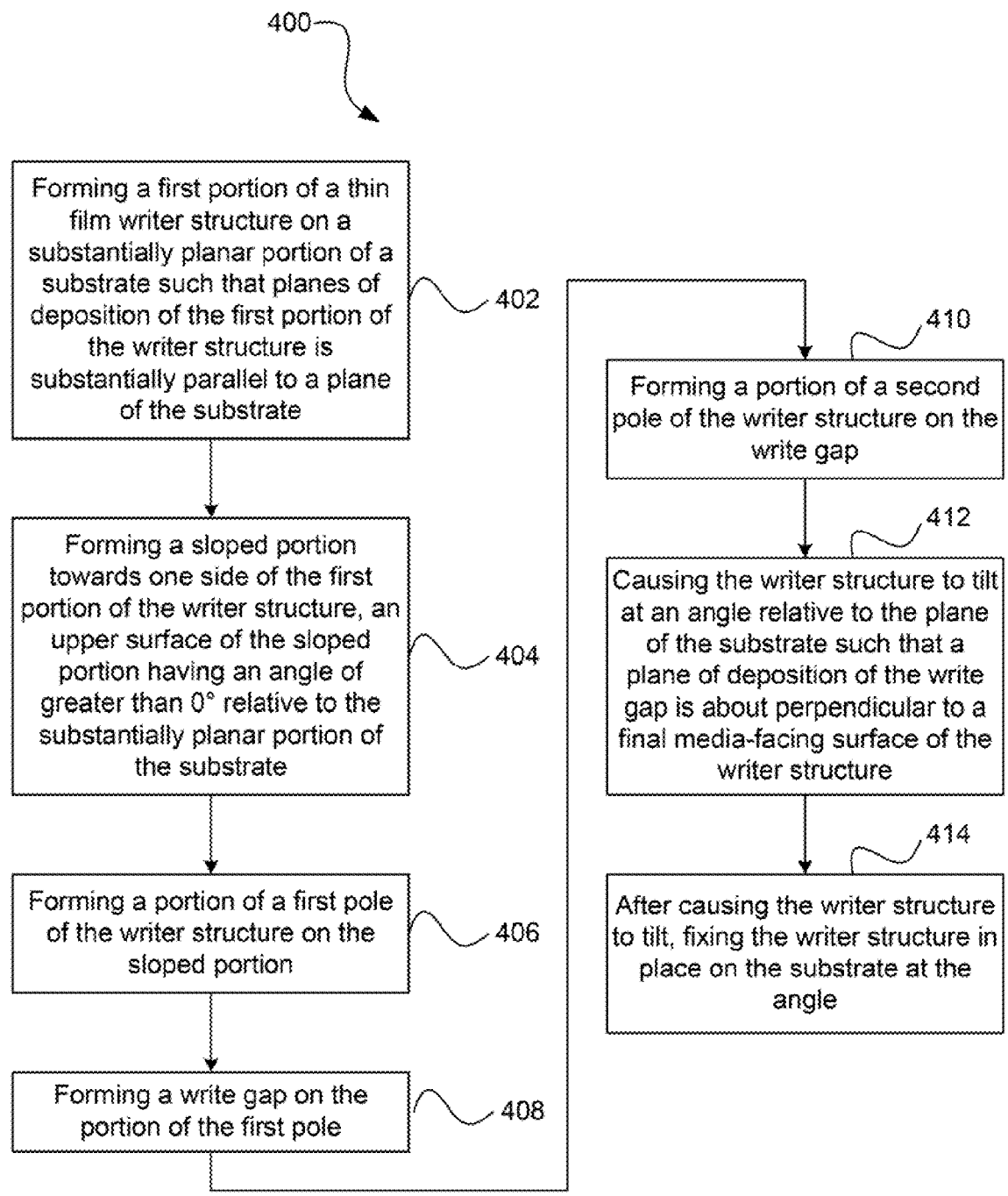
FIG. 4 is a flowchart of a method according to one embodiment.

FIG. 4 illustrates a method according to one embodiment. As an option, the present method 400 may be implemented in the context of the functionality and architecture of FIGS. 1-2 and 5-8. Of course, the method 400 may be carried out in any desired environment. It should be noted that the aforementioned definitions may apply during the present description.

With continued reference to FIG. 4, in operation 402, a first portion of a thin film writer structure is formed on a substantially planar portion of a substrate such that planes of deposition of the first portion of the writer structure is substantially parallel to a plane of the substrate.

In operation 404, a sloped portion is formed towards one side of the first portion of the writer structure, an upper surface of the sloped portion having an angle of greater than 0° relative to the substantially planar portion of the substrate.

In operation 406, a portion of a first pole of the writer structure is formed on the sloped portion.

In operation 408, a write gap is formed on the portion of the first pole.

In operation 410, a portion of a second pole of the writer structure is formed on the write gap.

In operation 412, the writer structure is caused to tilt at an angle relative to the plane of the substrate such that a plane of deposition of the write gap is about perpendicular to a media-facing surface of the writer structure.

In operation 414, after causing the writer structure to tilt, the writer structure is fixed in place on the substrate at the angle.

In another embodiment, the writer structure may be planarized along a plane substantially parallel to the plane of the substrate. Illustrative planarization techniques include chemical-mechanical polishing (CMP), grindings etc.

Another embodiment further comprises forming a magnetic sensor, wherein the sensor and the writer structure tilt together, as shown in FIGS. 8A and 8B.

FIGS. 5A-J show how a head is fabricated according to one embodiment. FIG. 5A, a step in a process to produce a tilted writer structure 500 is shown according to one embodiment. In this figure, a coil 502 is formed on a substrate along with the lower yoke 504. Layered on top of the coil structure is an insulator layer 506, which can be comprised of any material which can effectively insulate the coil from the other magnetic components of the writer structure. Side yokes 507 may also be present.

Figure 5B:
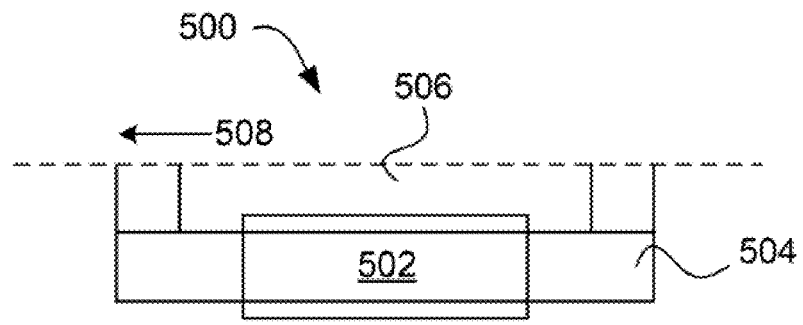
Figure 5C:
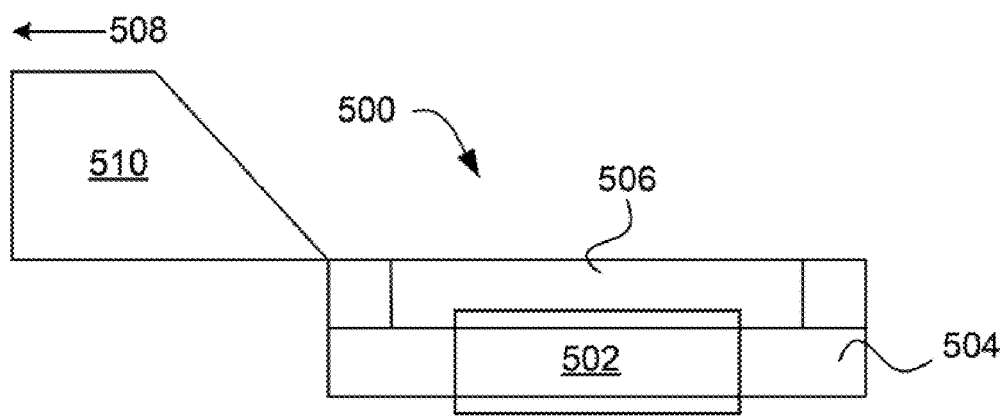

In FIG. 5B, a subsequent step in a process to produce a tilted writer structure 500 is shown according to one embodiment. In this figure, the existing structure is planarized (as indicated by the dashed line) to produce a smooth planar surface for continued processing of the writer structure 500. Any planarizing technique known in the art which can produce a smooth, planar surface may be used.

In FIG. 5C, a subsequent step in a process to produce a tilted writer structure 500 is shown according to one embodiment. In this figure, a ramp 510 is formed on the side (as indicated by arrow 508) of the writer structure 500. This ramp 510 may be made of any suitable material including insulating or magnetic materials. The ramp 510 will be used in the next few processing steps to further produce the tilted writer structure 500.

Figure 5D:
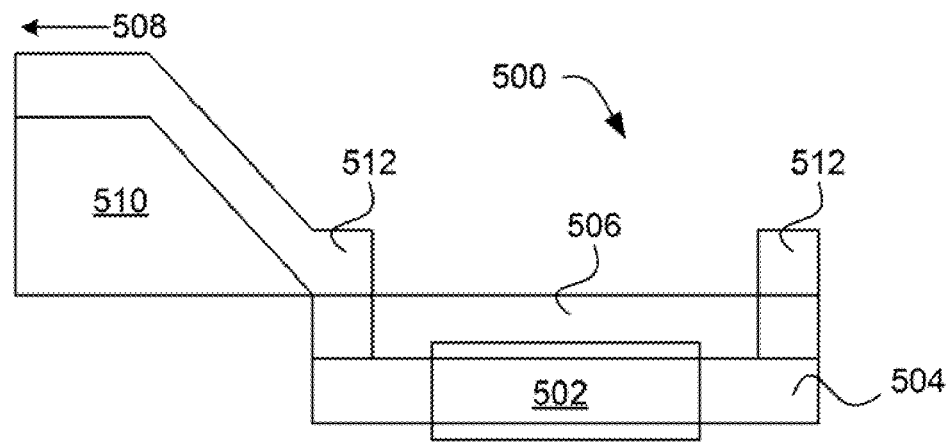

In FIG. 5D, a subsequent step in a process to produce a tilted writer structure 500 is shown according to one embodiment. In this figure, a first pole (P1) 512 is formed on the ramp 510 and on the back side of the writer structure 500.

Figure 5E:
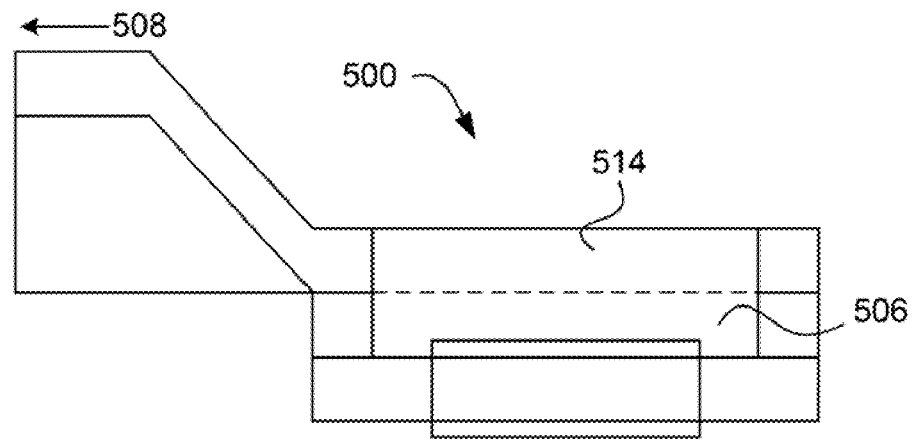

In FIG. 5E, a subsequent step in a process to produce a tilted writer structure 500 is shown according to one embodiment. In this figure, another insulator layer 514 is added to the existing insulator layer 506.

Figure 5F:
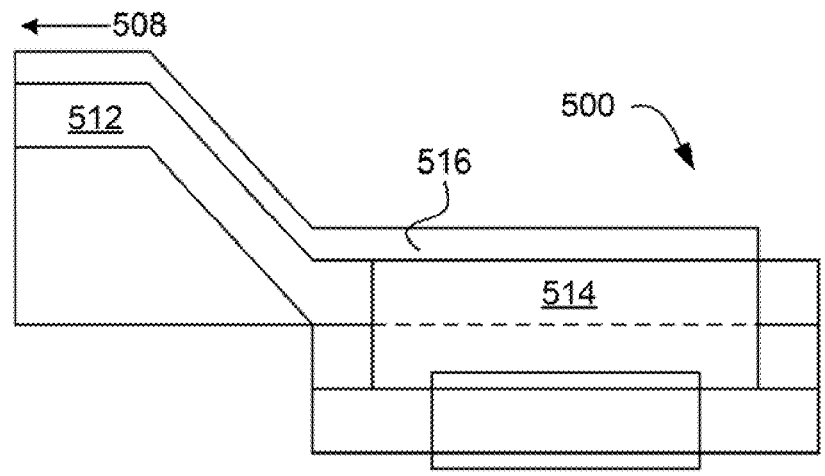

In FIG. 5F, a subsequent step in a process to produce a tilted writer structure 500 is shown according to one embodiment. In this figure, a write gap 516 is formed on top of the first pole 512 and insulator layer 514. This next insulator layer 514 may be of the same material as the first insulator layer 506, or may be of a differing material selected for its insulative properties.

Figure 5G:
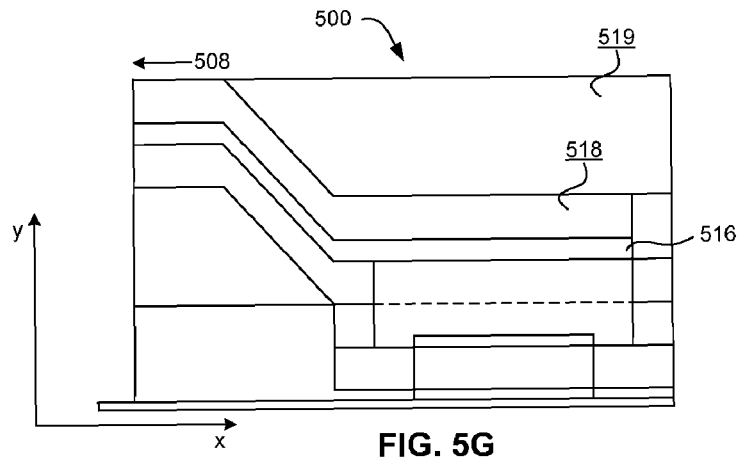
Figure 5H:
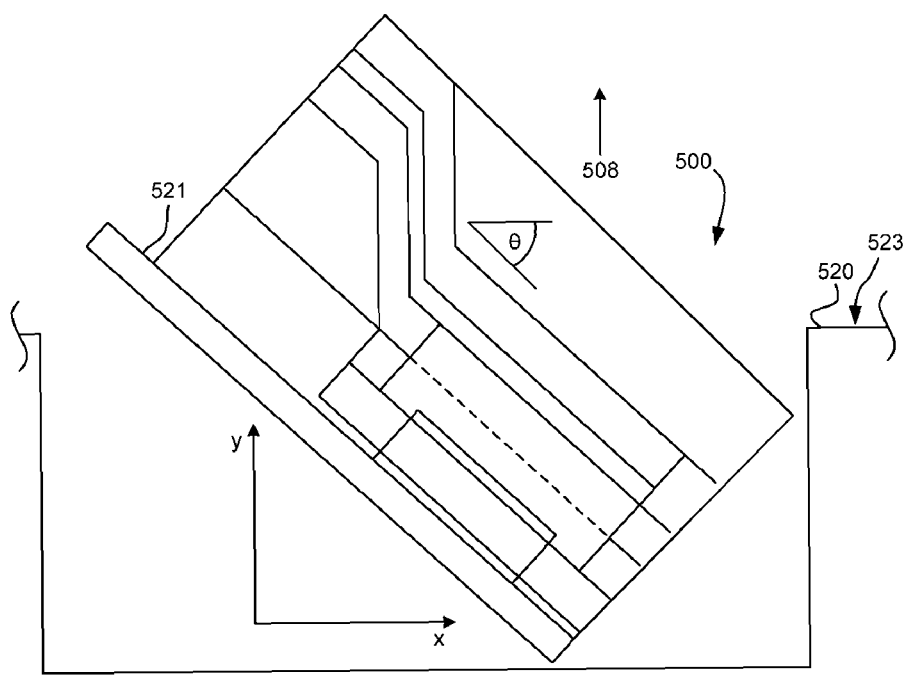
Figure 5I:
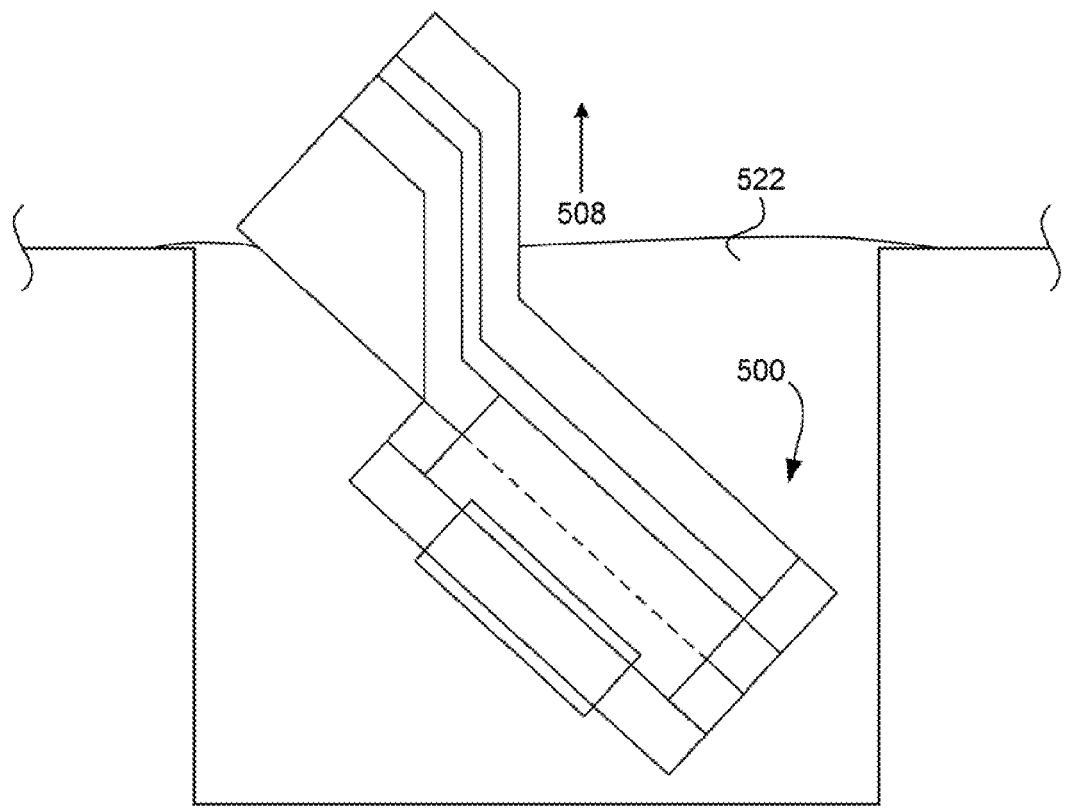
Figure 5J:
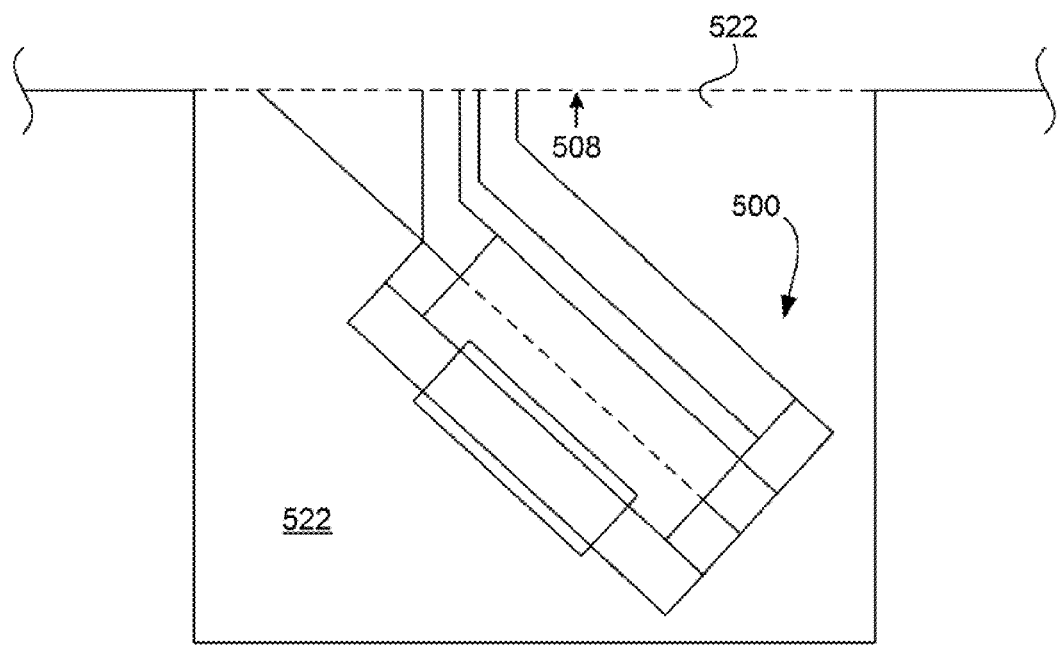

In FIG. 5G, a subsequent step in a process to produce a tilted writer structure 500 is shown according to one embodiment. In this figure, a second pole (P2) 518 is formed on the write gap 516. A fill layer 519 may be added over the second pole.

In FIG. 5H, a subsequent step in a process to produce a tilted writer structure 500 is shown according to one embodiment. In this exemplary figure, the writer structure 500 is tilted at an angle $\theta$ relative to the planar surface of the substrate. In some approaches, the writer structure 500 may be tilted by pivoting a supporting layer 521 about a pivot point. The pivot point may be positioned at a point along the length of layer 521. Other methods of tilting may also be employed, as described elsewhere herein.

For simplicity, the optional fill layer 519 and supporting layer 521 are not shown in the following figures. In FIG. 5I, a subsequent and optional step in a process to produce a tilted writer structure 500 is shown according to one embodiment. In this figure, a material 522 is formed around the writer structure 500. This material may be used to fix or protect the writer structure. The material is capable of holding the writer structure in place or protecting it, and does not interfere with the operation of the writer structure 500.

In FIG. 5J, a subsequent step in a process to produce a tilted writer structure 500 is shown according to one embodiment. In this figure, the writer structure 500 and fixing material 522 is planarized (as indicated by the dashed line) to form the recording surface. Further processing may occur, or the writer structure 500 may be ready for writing operations.

Figure 6:
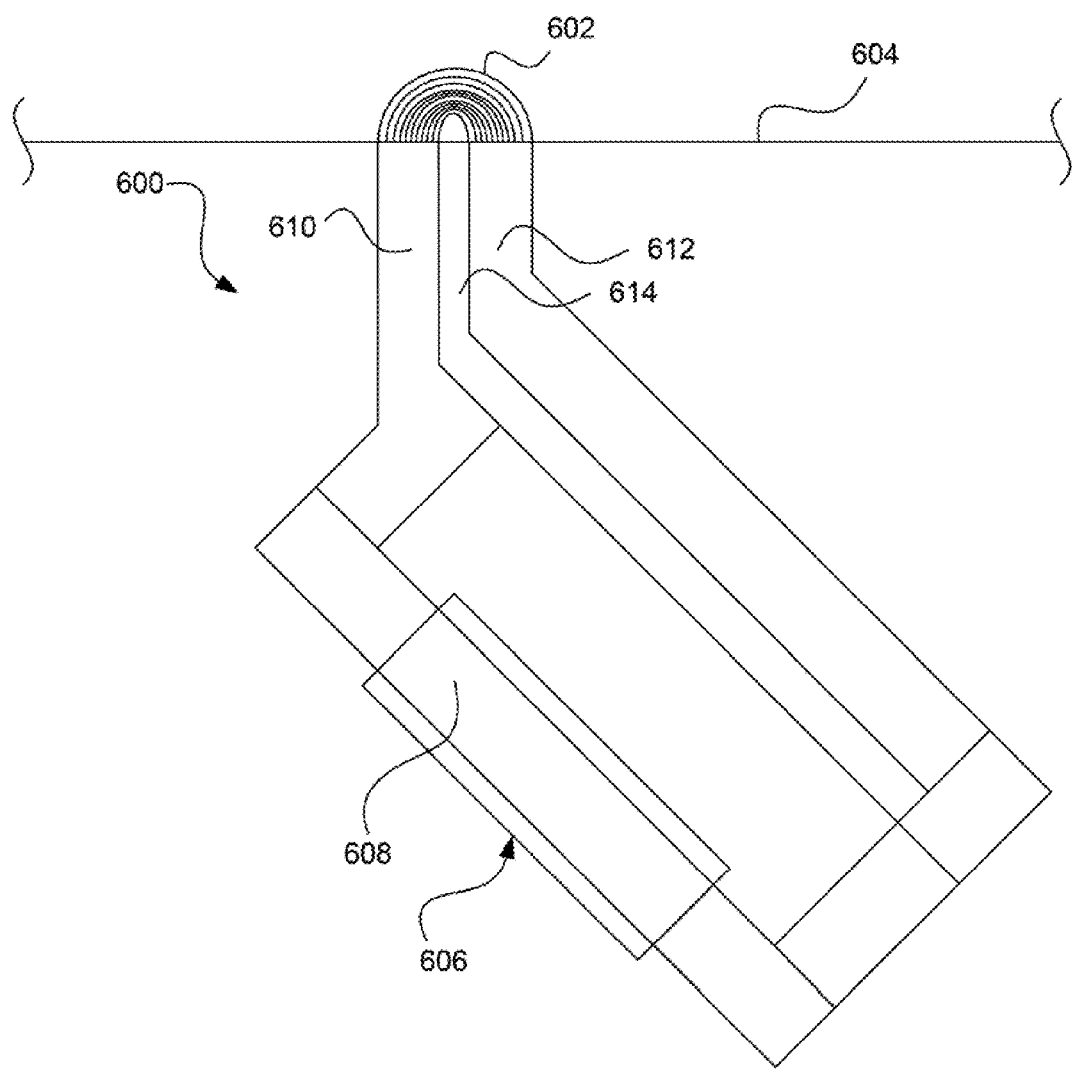
FIG. 6 is a schematic diagram of a tilted writer structure according to one embodiment.

FIG. 6 is a schematic diagram illustrating a tilted writer structure 600 according to one embodiment. Included in the diagram for illustrative purposes are the lines of flux 602 that may be produced from the writer structure 600 once it has been tilted relative to the planar surface of the media-facing surface 604.

With continued reference to FIG. 6, the writer structure 600 is comprised of a first portion 606 comprising at least a portion of a coil structure 608, at least a portion of a magnetic yoke, and a first pole 610, the first portion 606 being oriented at an angle of greater than 0° and less than 90° relative to a substantially planar portion of an underlying substrate, wherein the first pole 610 has an upper surface oriented about perpendicular to a media-facing surface of the first pole 610; and a second pole 612 formed above the first pole 610, a portion of the second pole 612 having a plane of deposition oriented about perpendicular to a media-facing surface of the second pole 612. A write gap 614 is positioned between the poles 610, 612, a portion of the write gap having a plane of deposition oriented about perpendicular to a final media-facing surface 604 of the write gap. For example, the final media-facing surface may be an air bearing surface (ABS), tape bearing surface (TBS), etc. In many embodiments, the media-facing surface will be about parallel to the plane of the substrate.

In one particularly preferred embodiment, the portion of the writer structure 600 which is in contact with the media surface 604 is perpendicular to the media surface 604. This arrangement creates a highly symmetric magnetic field when a writing operation is performed.

In another embodiment, the writer structure 600 is further comprised of a sloped portion under the first pole 610, the sloped portion having an upper surface oriented about perpendicular to a media-facing surface of the at least one pole. Such a sloped portion may be similar to the ramp described with reference to FIG. 5C.

Figure 7A:
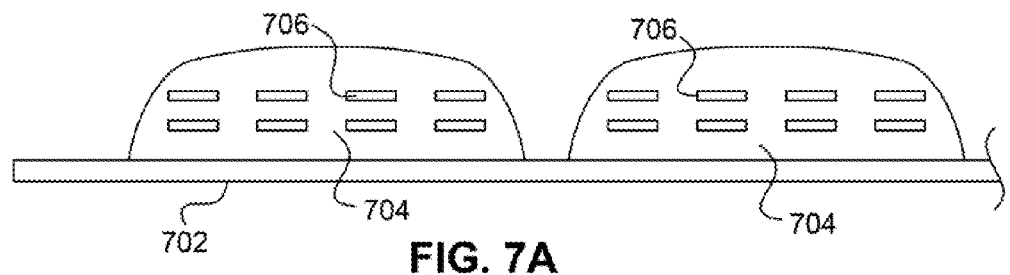
FIGS. 7A-7D are schematic diagrams illustrating steps in the production of a writer structure according to one embodiment.

FIG. 7A is a schematic diagram of a first step in the production of a writer structure 700 according to another embodiment. Here, a bottom pole (first pole) 702 is deposited on a substrate. An insulator layer 704 is then formed on the first pole 702, along with at least a portion of a coil structure 706. In this embodiment, a flat, or pancake type, coil is used for illustrative purposes, but any coil type may be used.

Figure 7B:
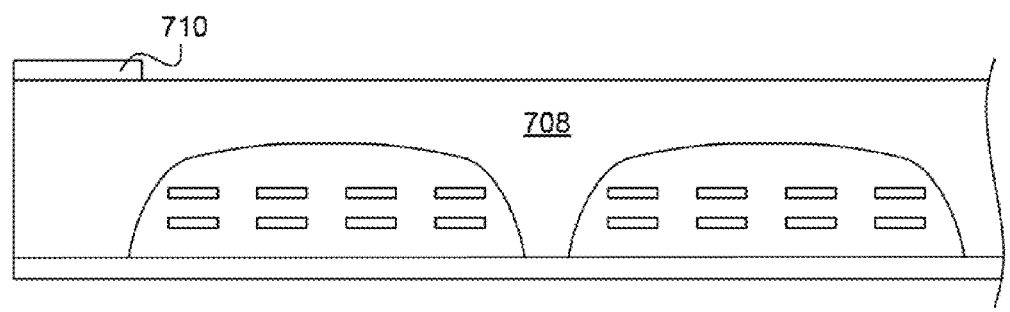

FIG. 7B is a schematic diagram of a subsequent step in the production of a writer structure 700 according to one embodiment. In this diagram, a pole material 708 is deposited on the structures already laid down on the substrate. This pole material 708 is optionally planarized, and then a ramp mask 710 is deposited on a portion of the pole material 708.

Figure 7C:
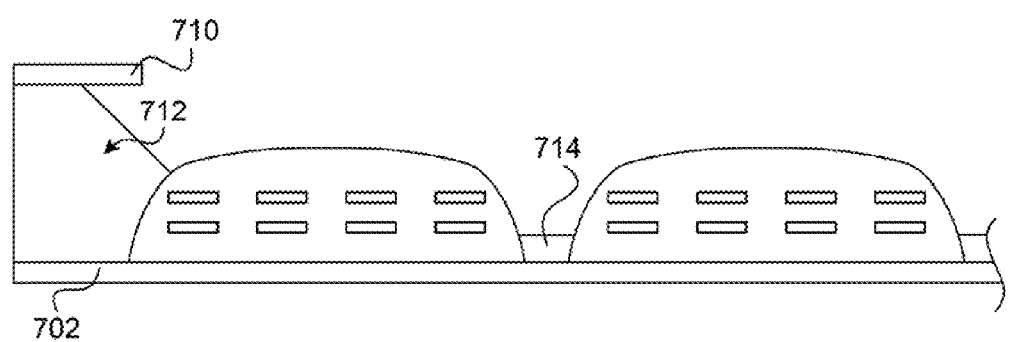

FIG. 7C is a schematic diagram of a subsequent step in the production of a writer structure 700 according to one embodiment. In this diagram, etching, e.g., isotropic etching, is used to form the ramp 712 which becomes a portion of the first pole 702. Also a portion of the pole material 714 may be formed in this step and will become a portion of the back gap in a subsequent step.

Figure 7D:
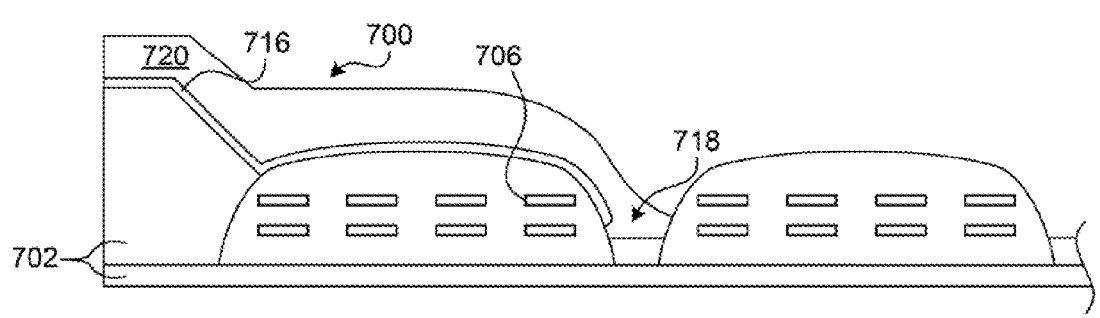

FIG. 7D is a schematic diagram of a subsequent step in the production of a writer structure 700 according to one embodiment. In this diagram, a write gap 716 is formed above the top of the ramp and coil structure. Then, a pole material is formed above the write gap 716 and connecting to the back gap 718 portion of the first pole 702. This pole material forms the top pole (second pole) 720. This writer structure can then be tilted at an angle of between about 0° and less than 90°.

Figure 7E:
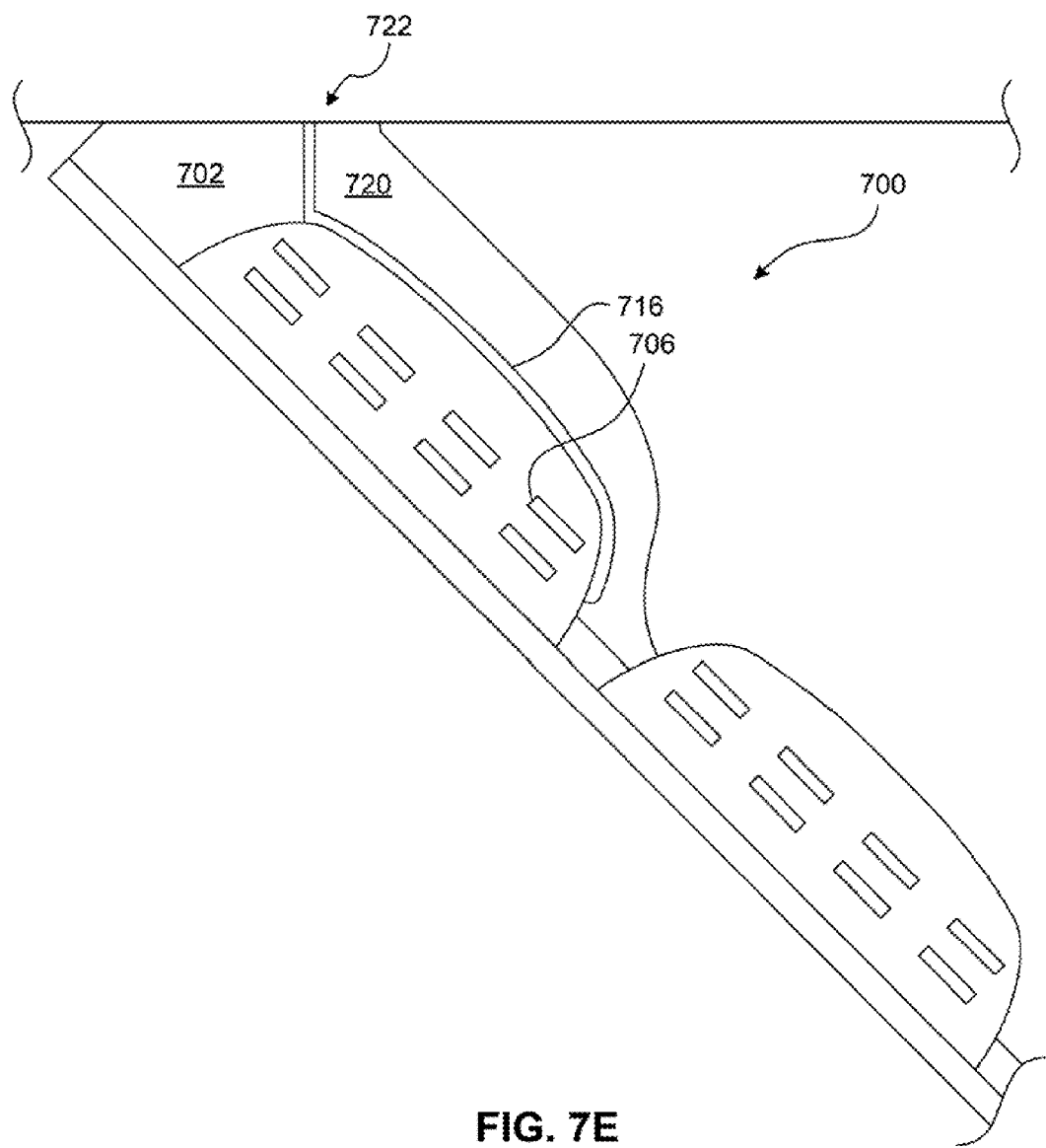
FIG. 7E is a schematic diagram of a writer structure which may be formed through the steps in FIGS. 7A-7D.

FIG. 7E shows a schematic diagram of a writer structure 700 which can result from the production steps illustrated in FIGS. 7A-7D, or through some other production method. Here, after tilting, a writer structure 700 includes a first portion comprising at least a portion of a coil structure 706, at least a portion of a magnetic yoke, a first pole 702, and a write gap 716, the portion of the write gap nearest the media-facing surface 722 being oriented at an angle of greater than 0° and less than 90° relative to a substantially planar portion of an underlying substrate, wherein the first pole 702 has an upper surface oriented about perpendicular to a media-facing surface 722 of the first. Also included is a second pole 720 formed above the first pole 702, a portion of the second pole 720 optionally having a plane of deposition oriented about perpendicular to a media-facing surface 722 of the second pole 720.

Now referring to FIG. 8A, another embodiment includes a writer structure 802 and a reader structure 804. In this embodiment, a reader structure 804 may be manufactured on the same wafer surface as a writer structure 802, here appearing below the writer structure 802. The reader structure may be used as a servo-reader or data-reader. These structures may then be tilted at an angle θ such that they can be planarized together at a media surface 806.

Illustrative methods for tilting structures, including at least some of those disclosed herein, are described in U.S. patent application Ser. No. 12/547,224 to Biskeborn et al., now U.S. Pat. No. 8,240,024 and having title "Methods for Fabricating Magnetic Transducers Using Post-Deposition Tilting," filed concurrently herewith, and which is herein incorporated by reference.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a first portion comprising at least a portion of a thin film coil structure and at least a portion of a thin film magnetic yoke, a plane of deposition of the first portion being oriented at an angle of greater than 0° and less than 90° relative to a substantially planar portion of an underlying substrate;
   a material fixing the first portion in place at the angle of orientation relative to the substrate, the first portion having physical characteristics of tilting after formation thereof to the angle of orientation;
   a first pole;
   a second pole; and
   a thin film write gap, a portion of the write gap having a plane of deposition oriented about perpendicular to a final media-facing surface of the write gap.

2. A system as recited in claim 1, further comprising a sloped portion under the first pole, the sloped portion having an upper surface oriented about perpendicular to a media-facing surface of the at least one pole.

3. A method for forming a system as recited in claim 1, the method comprising:
- forming the first portion on the substantially planar portion of the substrate such that planes of deposition of the first portion are substantially parallel to a plane of the substrate;
- forming a portion of the write gap at an angle of greater than 0° relative to the substantially planar portion of the substrate; and
- causing the writer structure to tilt at the angle relative to the plane of the substrate such that a plane of deposition of the write gap is oriented about perpendicular to a final media-facing surface of the writer structure.

4. A method as recited in claim 3, wherein the substrate comprises silicon.

5. A method as recited in claim 3, further comprising planarizing the writer structure along a plane substantially parallel to the plane of the substrate.

6. A method as recited in claim 3, wherein the writer structure is formed on a rigid platform that tilts with the writer structure.

7. A method as recited in claim 3, wherein an axis of the tilting is about parallel to the plane of the substrate.

8. A method as recited in claim 3, further comprising forming a magnetic sensor, wherein the sensor and the writer structure tilt together.

9. A method as recited in claim 3, further comprising removing a sacrificial portion of the substrate for creating a pivot point about which the writer structure pivots.

10. A method as recited in claim 9, wherein the pivot point is under and off-center from the writer structure.

11. A method as recited in claim 9, wherein the pivot point is spaced apart from the writer structure such that the writer structure pivots along an arc.

12. A method as recited in claim 9, wherein removing the portion of the substrate allows built-in stresses to cause the writer structure to tilt at the angle.

13. A method as recited in claim 3, and further comprising after causing the writer structure to tilt, fixing the writer structure in place on the substrate at the angle.

14. A system, comprising:
- a thin film first portion comprising at least a portion of a thin film coil structure, at least a portion of a thin film magnetic yoke, a thin film first pole, and a thin film write gap, a plane of deposition of a portion of the write gap nearest a media-facing surface of the first portion being oriented at an angle of greater than 0° and less than 90° relative to a substantially planar portion of an underlying substrate, wherein the first pole has an upper surface oriented about perpendicular to a media-facing surface of the first pole;
- a material fixing the first portion in place at the angle of orientation relative to the substrate, the first portion having physical characteristics of tilting after formation thereof to the angle of orientation; and
- a second pole formed above the first pole.

15. A system as recited in claim 14, wherein the thin films of the coil structure, portion of the magnetic yoke, first pole and write gap are physically characterized as formed in situ relative to each other.

16. A method for forming the system of claim 14, the method comprising:
- forming a first portion of a thin film writer structure on a substantially planar portion of a substrate such that planes of deposition of the first portion of the writer structure is substantially parallel to a plane of the substrate;
- forming a sloped portion towards one side of the first portion of the writer structure, an upper surface of the sloped portion having an angle of greater than 0° relative to the substantially planar portion of the substrate;
- forming a portion of a first pole of the writer structure on the sloped portion;
- forming a write gap on the portion of the first pole;
- forming a portion of a second pole of the writer structure on the write gap; and
- causing the writer structure to tilt at an angle relative to the plane of the substrate such that a plane of deposition of the write gap is about perpendicular to a final media-facing surface of the writer structure; and
- after causing the writer structure to tilt, fixing the writer structure in place on the substrate at the angle.

17. A method as recited in claim 16, further comprising planarizing the writer structure along a plane substantially parallel to the plane of the substrate.

18. A method as recited in claim 16, further comprising forming a magnetic sensor, wherein the sensor and the writer structure tilt together.

* * * * *